2,789,108

COMBINATION OF 2,4,6-TRIALKYLPHENOLS AND MONO-ETHERS OF DIHYDRIC PHENOLS AS RUBBER ANTIOXIDANTS

Gordon Stansfield Mills, Ruabon, and Henry W. H. Robinson, Deeside, Llangollen, Wales, assignors to Monsanto Chemicals Limited, London, England, a British company No Drawing. Application February 24, 1953,
Serial No. 338,604

Claims priority, application Great Britain
February 27, 1952

11 Claims. (Cl. 260—45.95)

This invention relates to antioxidants for rubber, and especially to antioxidants which do not seriously discolour rubber stocks in which they are used and which are therefore suitable for use in white and other light-coloured compositions.

It has long been known that vulcanized rubber is liable to deteriorate on exposure to the action of heat, light and oxygen-containing gases, and that deterioration occurs in the atmosphere under normal conditions of use. To resist this effect various substances have been proposed for use in rubber as antioxidants, but many of these suffer from the disadvantage that they cause darkening with time and badly discolour the rubber stocks in which they are incorporated if these should be of a light colour. This problem does not arise with dark-coloured stocks obtained using carbon blacks, for instance, but it is a serious difficulty in such compositions as the white rubber stocks obtained using zinc oxide, titanium dioxide and analogous substances.

In determining the effect of rubber antioxidants there are two standard tests, the first being the action of oxygen under pressure on a vulcanised rubber prepared using the antioxidant (the so-called "oxygen bomb test") and the second the behaviour of the sample of vulcanised rubber on heating in a hot air oven (the "hot air oven test"). For an antioxidant to be really satisfactory it is necessary for it to give good results in both of these tests, and even among the limited number of antioxidants which do not badly discolour light-coloured rubber stocks only a few are capable of giving adequately good results in both of them.

It has now been found that an effective antioxidant action can be obtained by using as an antioxidant in vulcanised rubber a mixture of a 2:4:6-trialkylphenol and a mono-ether of a dihydric phenol, and moreover that mixtures of this kind are suitable for use in light-coloured stocks. Neither of these two types of compounds alone will give satisfactory results in both the oxygen bomb test and the hot air oven test, but by using the two in conjunction eminently satisfactory results can be obtained in both tests, as will be seen from the figures given later in this specification.

The 2:4:6-trialkyl-phenol used is preferably a 2:4-dimethyl-6-actyl-phenol (especially one obtained by the reaction of 2:4-dimethyl-phenol with diisobutylene), and other trialkyl-phenols which can be used are 2:6-di-methyl-4-octyl-phenol (again one obtained from the dimethyl-phenol and diisobutylene is very suitable) and 2:6-dibutyl-4-methyl-phenol, in particular where the butyl group is tertiary butyl. It is not necessary to use a pure 2:4:6-trialkyl-phenol in preparing mixtures of the above kind, and for instance an alkylated commercial cresylic acid can be used in admixture with the mono-ether. Thus an octylated cresylic acid obtained by octylating the acid with diisobutylene can very suitably be used in conjunction with the mono-ether; such an octylated product might contain several isomeric 2:4:6-trialkyl-phenols along with other substances.

The mono-ether of a dihydric phenol used according to the invention is preferably the mono-benzyl ether, though other ethers, for instance the mono-ethyl ether, are also suitable. In practice a mono-ether of a commercial mixture of dihydric phenols is best used, especially one containing a preponderance of catechol, and very good results have been obtained using the mono-ethers, particularly the mono-benzyl ether, of a commercial mixture of dihydric phenols containing about 90% by weight of catechol and methyl-substituted catechols. Other commercial mixtures containing more equal proportions of isomeric dihydric phenols can also be used in forming the ether.

The proportions of the two constituents of the antioxidant mixture, the 2:4:6-trialkyl-phenol on the one hand and the mono-ether on the other, can lie between wide limits. Good results can be obtained using mixtures containing these in proportions from 25:75 to 75:25 by weight, and also mixtures outside these limits. Very satisfactory results can be obtained using approximately equal proportions by weight of the trialkyl-phenol and the mono-ether, but on the whole, taking all the factors into account (including the inevitable discolouration of the rubber on ageing) it is preferable to have rather more of the 2:4:6-trialkyl-phenol present than the mono-ether. Mixtures containing these approximately in the proportions 75:25 by weight are probably to be preferred. Thus in the particular instance of a mixture of 2:4-dimethyl-6-octyl phenol and the mono-benzyl ether of the mixture of dihydric phenols containing about 90% by weight of catechol and methyl-substituted catechols referred to above the 75:25 mixture has been found generally preferable to either a 50:50 or a 25:75 mixture.

It will be appreciated that the antioxidants of the invention can be used with dark-coloured rubber stocks also, but they are of particular value with light-coloured stocks owing to the limited number of satisfactory antioxidants available which do not discolour such stocks unduly. They are of value both with natural and synthetic rubber.

It will of course be understood that while the invention has been described with reference to the use of a mixture of antioxidants, the constituents of the mixture may be incorporated in the rubber separately. This is indicated in the claims. In general, however, it will be found more convenient to mix the constituents together before use.

The invention is illustrated by the following examples:

EXAMPLE 1

A rubber stock of the following composition was compounded on a laboratory mill:

| | Parts by weight |
|---|---|
| Pale crepe rubber | 100 |
| Blanc fixe | 50 |
| Zinc oxide | 5 |
| Titanium dioxide | 5 |
| Stearic acid | 1 |
| Sulphur | 2 |
| Accelerator (tetramethyl thiuram disulphide) | 0.375 |

The stock was first made up without any antioxidant, and then with 1 part by weight of a mixture of equal quantities by weight of 2:4-dimethyl-6-octyl-phenol (obtained by the reaction of 2:4-dimethyl-phenol with di-isobutylene) and of the mono-benzyl ether of a commercial mixture of dihydric phenols containing about 9% by weight of catechol and methyl-substituted catechols.

Each of the two stocks was vulcanised at 126° C. for 20 minutes, and the physical properties of the vulcanised rubbers obtained were determined before ageing and (a) after ageing for 4 days at 70° C. in an oxygen bomb at a pressure of 300 lbs./sq. inch; (b) after ageing for 7 days at 70° C. in a hot air oven.

The conditions of British Standard Specification No. 903/1950 were observed.

The following results were obtained:

Oxygen bomb test

(i) TENSION STRENGTH (KGMS./SQ. CM.)

|  | Original | After 4 days | Percentage of original figure |
|---|---|---|---|
| Stock without antioxidant | 246 | 149 | 61 |
| Stock with antioxidant | 228 | 194 | 85 |

(ii) PERCENTAGE ELONGATION AT BREAK

| Stock without antioxidant | 720 | 623 | 87 |
|---|---|---|---|
| Stock with antioxidant | 720 | 645 | 89 |

(iii) MODULUS AT 500% ELONGATION (KGMS./SQ. CM.)

| Stock without antioxidant | 91 | 84 | 92 |
|---|---|---|---|
| Stock with antioxidant | 82 | 98 | 119 |

Hot air oven test

(i) TENSION STRENGTH (KGMS./SQ. CM.)

|  | Original | After 7 days | Percentage of original figure |
|---|---|---|---|
| Stock without antioxidant | 246 | 150 | 61 |
| Stock with antioxidant | 228 | 184 | 81 |

(ii) PERCENTAGE ELONGATION AT BREAK

| Stock without antioxidant | 720 | 578 | 80 |
|---|---|---|---|
| Stock with antioxidant | 720 | 598 | 83 |

(iii) MODULUS AT 500% ELONGATION (KGMS./SQ. CM.)

| Stock without antioxidant | 91 | 97 | 106 |
|---|---|---|---|
| Stock with antioxidant | 82 | 107 | 130 |

In order to test any discolouring effect of the antioxidant the two vulcanised stocks were subjected to the action of ultraviolet light for a period of five hours, and the discolouration at the end of the period was noted, as follows:

Stock without antioxidant_____Exceedingly pale yellow.
Stock with antioxidant_____Very pale yellow.

EXAMPLE 2

The tests carried out in Example 1 were repeated using the same quantity (1 part by weight) of different mixtures of the 2:4-dimethyl-6-octyl-phenol and the mono-benzyl ether of a mixture of dihydric phenols containing about 90% by weight of catechol and methyl-substituted catechols.

Mixtures containing these respectively in the proportions 25:75, 50:50 and 75:25 by weight were used, and in this instance the physical properties of the vulcanised rubbers obtained were determined before ageing and (a) after ageing for 4 days at 70° C. in an oxygen bomb at a pressure of 300 lbs./sq. inch; (b) after ageing for 8 days at 70° C. in a hot air oven.

The following results were obtained. It is to be observed that the results using the 50:50 mixture are slightly different from those of Example 1, as a different series of tests was involved and there was of course the usual variation of results from batch to batch as was to be expected.

Oxygen bomb test

(i) TENSION STRENGTH (KGMS./SQ. CM.)

|  | Original | After 4 days | Percentage of original figure |
|---|---|---|---|
| Stock with 25:75 mixture as antioxidant | 235 | 198 | 84 |
| Stock with 50:50 mixture as antioxidant | 221 | 200 | 90 |
| Stock with 75:25 mixture as antioxidant | 232 | 205 | 88 |

(ii) PERCENTAGE ELONGATION AT BREAK

| Stock with 25:75 mixture as antioxidant | 715 | 655 | 91 |
|---|---|---|---|
| Stock with 50:50 mixture as antioxidant | 700 | 640 | 91 |
| Stock with 75:25 mixture as antioxidant | 705 | 640 | 90 |

(iii) MODULUS AT 500% ELONGATION (KGMS./SQ. CM.)

| Stock with 25:75 mixture as antioxidant | 89 | 98 | 110 |
|---|---|---|---|
| Stock with 50:50 mixture as antioxidant | 86 | 103 | 119 |
| Stock with 75:25 mixture as antioxidant | 92 | 109 | 118 |

Hot air oven test

(i) TENSION STRENGTH (KGMS./SQ. CM.)

|  | Original | After 8 days | Percentage of original figure |
|---|---|---|---|
| Stock with 25:75 mixture as antioxidant | 235 | 186 | 79 |
| Stock with 50:50 mixture as antioxidant | 221 | 204 | 92 |
| Stock with 75:25 mixture as antioxidant | 232 | 187 | 80 |

(ii) PERCENTAGE ELONGATION AT BREAK

| Stock with 25:75 mixture as antioxidant | 715 | 580 | 81 |
|---|---|---|---|
| Stock with 50:50 mixture as antioxidant | 700 | 610 | 87 |
| Stock with 75:25 mixture as antioxidant | 705 | 585 | 83 |

(iii) MODULUS AT 500% ELONGATION (KGMS./SQ. CM.)

| Stock with 25:75 mixture as antioxidant | 89 | 119 | 134 |
|---|---|---|---|
| Stock with 50:50 mixture as antioxidant | 86 | 117 | 136 |
| Stock with 75:25 mixture as antioxidant | 92 | 118 | 128 |

EXAMPLE 3

The tests carried out in Example 1 were repeated using the same quantity (1 part by weight) of (a) the antioxidant mixture of Example 1, (b) a similar antioxidant mixture with the 2:4-dimethyl-6-octyl-phenol replaced by 2:6-dimethyl-4-octyl-phenol (obtained by the reaction 2:6-dimethyl-phenol with diisobutylene).

Again the physical properties of the vulcanised rubbers obtained were determined before ageing and (a) after ageing for 4 days at 70° C. in an oxygen bomb at a pressure of 300 lbs./sq. inch; (b) after ageing for 8 days at 70° C. in a hot air oven.

The following results were obtained, those with the first of the antioxidant mixtures agreeing within the usual experimental variation with the results of Example 1:

Oxygen bomb test (i) TENSION STRENGTH (KGMS./SQ. CM.)

|  | Original | After 4 days | Percentage of original figure |
|---|---|---|---|
| Stock with antioxidant (a) | 233 | 204 | 87 |
| Stock with antioxidant (b) | 230 | 189 | 82 |

(ii) PERCENTAGE ELONGATION AT BREAK

|  | | | |
|---|---|---|---|
| Stock with antioxidant (a) | 690 | 640 | 92 |
| Stock with antioxidant (b) | 685 | 625 | 91 |

(iii) MODULUS AT 500% ELONGATION (KGMS./SQ. CM.)

|  | | | |
|---|---|---|---|
| Stock with antioxidant (a) | 99 | 101 | 102 |
| Stock with antioxidant (b) | 100 | 100 | 100 |

Hot air oven test (i) TENSION STRENGTH (KGMS./SQ. CM.)

|  | Original | After 8 days | Percentage of original figure |
|---|---|---|---|
| Stock with antioxidant (a) | 233 | 183 | 78 |
| Stock with antioxidant (b) | 230 | 199 | 86 |

(ii) PERCENTAGE ELONGATION AT BREAK

|  | | | |
|---|---|---|---|
| Stock with antioxidant (a) | 690 | 575 | 83 |
| Stock with antioxidant (b) | 685 | 600 | 87 |

(iii) MODULUS AT 500% ELONGATION (KGMS./SQ. CM.)

|  | | | |
|---|---|---|---|
| Stock with antioxidant (a) | 99 | 123 | 124 |
| Stock with antioxidant (b) | 100 | 123 | 123 |

EXAMPLE 4

The tests carried out in Example 1 were repeated using the same quantity (1 part by weight) of (a) the antioxidant mixture of Example 1, (b) a similar antioxidant mixture with the 2:4-dimethyl-6-octyl-phenol replaced by an octylated cresylic acid; in addition a mono-benzyl ether of a commercial mixture of dihydric phenols containing rather less catechol, but still a preponderance of catechol, was used.

The octylated cresylic acid was obtained by alkylating a cresylic acid of boiling range 214–224° C. (at atmospheric pressure) with diisobutylene at 130° C., using sulphuric acid as catalyst. The octylated cresylic acid product had a boiling range of 130–180° C. (at 9 mm. of mercury).

Again the physical properties of the vulcanised rubbers obtained were determined before ageing and (a) after ageing for 4 days at 70° C. in an oxygen bomb at a pressure of 300 lbs./sq. inch; (b) after ageing for 8 days at 70° C. in a hot air oven.

The following results were obtained, as before:

Oxygen bomb test (i) TENSION STRENGTH (KGMS./SQ. CM.)

|  | Original | After 4 days | Percentage of original figure |
|---|---|---|---|
| Stock with antioxidant (a) | 219 | 187 | 85 |
| Stock with antioxidant (b) | 214 | 199 | 93 |

(ii) PERCENTAGE ELONGATION AT BREAK

|  | | | |
|---|---|---|---|
| Stock with antioxidant (a) | 745 | 680 | 91 |
| Stock with antioxidant (b) | 720 | 685 | 95 |

(iii) MODULUS AT 500% ELONGATION (KGMS./SQ. CM.)

|  | | | |
|---|---|---|---|
| Stock with antioxidant (a) | 71 | 84 | 118 |
| Stock with antioxidant (b) | 77 | 87 | 113 |

Hot air oven test (i) TENSION STRENGTH (KGMS./SQ. CM.)

|  | Original | After 8 days | Percentage of original figure |
|---|---|---|---|
| Stock with antioxidant (a) | 224 | 201 | 90 |
| Stock with antioxidant (b) | 225 | 193 | 86 |

(ii) PERCENTAGE ELONGATION AT BREAK

|  | | | |
|---|---|---|---|
| Stock with antioxidant (a) | 725 | 620 | 85 |
| Stock with antioxidant (b) | 720 | 625 | 87 |

(iii) MODULUS AT 500% ELONGATION (KGMS./SQ. CM.)

|  | | | |
|---|---|---|---|
| Stock with antioxidant (a) | 75 | 109 | 145 |
| Stock with antioxidant (b) | 72 | 100 | 199 |

EXAMPLE 5

This example illustrates the effectiveness of the antioxidant mixtures even in the presence of a copper poisoner, which greatly increased the tendency for oxidation of the rubber to occur.

In this example a rubber stock was made up as described in Example 1 except that 0.5 part by weight of copper oleate was included in the rubber stock as contaminant. The stock was first made up without any antioxidant, and then with 1 part by weight of (a) the antioxidant mixture of Example 1, (b) a similar antioxidant mixture with the 2:4-dimethyl-6-octylphenol replaced by 2:6-dimethyl-4-octyl-phenol (obtained by the reaction 2:6-dimethyl-phenol with diisobutylene).

Each of the stocks was vulcanised at 126° C. for 20 minutes, and the physical properties of the vulcanised rubbers obtained were determined before ageing and after ageing for 1 day at 70° C. in an oxygen bomb at a pressure of 300 lbs./sq. inch.

The following results were obtained:

Oxygen bomb test

(i) TENSION STRENGTH (KGMS./SQ. CM.)

|  | Original | After 1 day | Percentage of original figure |
|---|---|---|---|
| Stock without antioxidant | 231 | Sample melted | |
| Stock with antioxidant (a) | 227 | 206 | 91 |
| Stock with antioxidant (b) | 224 | 113 | 50 |

(ii) PERCENTAGE ELONGATION AT BREAK

|  | Original | After 1 day | Percentage of original figure |
|---|---|---|---|
| Stock without antioxidant | 640 | Sample melted | |
| Stock with antioxidant (a) | 645 | 635 | 98 |
| Stock with antioxidant (b) | 635 | 540 | 85 |

(iii) MODULUS AT 500% ELONGATION (KGMS./SQ. CM.)

|  | Original | After 1 day | Percentage of original figure |
|---|---|---|---|
| Stock without antioxidant | 115 | Sample melted | |
| Stock with antioxidant (a) | 112 | 108 | 96 |
| Stock with antioxidant (b) | 113 | 92 | 81 |

It will be seen that the antioxidant mixture containing 2:4-dimethyl-6-octyl-phenol was in this instance superior.

EXAMPLE 6

This example is similar to Example 5, illustrating the effectiveness of the antioxidant mixtures in the presence of a copper poisoner.

Here the test of Example 5 was repeated, using 1 part by weight of (a) the antioxidant mixture of Example 1, (b) a similar antioxidant mixture with the 2:4-dimethyl-6-octyl-phenol replaced by the octylated cresylic acid indicated in Example 4, and using a mono-ether as indicated in Example 4.

The oxygen bomb test in this instance was continued for 2 days, and the following results were obtained:

Oxygen bomb test

(i) TENSION STRENGTH (KGMS./SQ. CM.)

|  | Original | After 2 days | Percentage of original figure |
|---|---|---|---|
| Stock with antioxidant (a) | 217 | 203 | 93 |
| Stock with antioxidant (b) | 235 | 200 | 85 |

(ii) PERCENTAGE ELONGATION AT BREAK

|  | Original | After 2 days | Percentage of original figure |
|---|---|---|---|
| Stock with antioxidant (a) | 660 | 655 | 99 |
| Stock with antioxidant (b) | 680 | 655 | 96 |

(iii) MODULUS AT 500% ELONGATION (KGMS./SQ. CM.)

|  | Original | After 2 days | Percentage of original figure |
|---|---|---|---|
| Stock with antioxidant (a) | 103 | 101 | 98 |
| Stock with antioxidant (b) | 100 | 98 | 98 |

What is claimed is:

1. A sulfur-vulcanizable rubber containing an antioxidant comprising a mixture of (a) a 2:4:6-trialkyl-phenol selected from the group consisting of 2:4-dimethyl-6-octyl-phenol, 2:6-dimethyl-4-octyl-phenol and 2:6-dibutyl-4-methyl-phenol and (b) a mono-ether of a dihydric phenol wherein said ether is selected from the group consisting of benzyl and ethyl, and wherein the ratio of (a) to (b) is from 25:75 to 75:25 by weight.

2. A sulfur-vulcanizable rubber as defined in claim 1 wherein (b) is a mono-benzyl ether of a dihydric phenol.

3. A sulfur-vulcanizable rubber as defined in claim 1 wherein (b) is a mono-ethyl ether of a dihydric phenol.

4. A sulfur-vulcanizable rubber as defined in claim 1 wherein the ratio of (a) to (b) is 75:25 by weight.

5. A sulfur vulcanized rubber containing an anti-oxidant comprising a mixture of (a) a 2:4:6-trialkyl-phenol selected from the group consisting of 2:4-dimethyl-6-octyl-phenol, 2:6-dimethyl-4-octyl-phenol and 2:6-dibutyl-4-methyl-phenol and (b) a mono-ether of a dihydric phenol wherein said ether is selected from the group consisting of benzyl and ethyl, and wherein the ratio of (a) to (b) is from 25:75 to 75:25 by weight.

6. A sulfur vulcanized rubber as defined in claim 5 wherein (b) is a mono-benzyl ether of a dihydric phenol.

7. A sulfur vulcanized rubber as defined in claim 5 wherein (b) is a mono-ethyl ether of a dihydric phenol.

8. A sulfur vulcanized rubber as defined in claim 5 wherein the ratio of (a) to (b) is 75:25 by weight.

9. A method of rendering a sulfur-vulcanizable rubber resistant to deterioration comprising incorporating in the rubber an antioxidant comprising a mixture of (a) a 2:4:6-trialkyl-phenol selected from the group consisting of 2:4-dimethyl-6-octyl-phenol, 2:6-dimethyl-4-octyl-phenol and 2:6-dibutyl-4-methyl-phenol and (b) a mono-ether of a dihydric phenol wherein said ether is selected from the group consisting of benzyl and ethyl, and wherein the ratio of (a) to (b) is from 25:75 to 75:25 by weight.

10. A method of rendering sulfur-vulcanized rubber resistant to deterioration comprising incorporating in the rubber an antioxidant comprising a mixture of (a) a 2:4:6-trialkyl-phenol selected from the group consisting of 2:4-dimethyl-6-octyl-phenol, 2:6-dimethyl-4-octyl-phenol and 2:6-dibutyl-4-methyl-phenol and (b) a mono-ether of a dihydric phenol wherein said ether is selected from the group consisting of benzyl and ethyl, and wherein the ratio of (a) to (b) is from 25:75 to 75:25 by weight.

11. A method of rendering sulfur-vulcanized rubber resistant to deterioration comprising incorporating in the rubber stock prior to vulcanization and subsequently vulcanizing the rubber an antioxidant comprising a mixture of (a) a 2:4:6-trialkyl-phenol selected from the group consisting of 2:4-dimethyl-6-octyl-phenol, 2:6-dimethyl-4-octyl-phenol and 2:6-dibutyl-4-methyl-phenol and (b) a mono-ether of a dihydric phenol wherein said ether is selected from the group consisting of benzyl and ethyl, and wherein the ratio of (a) to (b) is from 25:75 to 75:25 by weight.

References Cited in the file of this patent

UNITED STATES PATENTS

| 2,133,297 | Jones | Oct. 18, 1938 |
| 2,581,906 | Smith | Jan. 8, 1952 |